Aug. 28, 1923.
K. P. McELROY
NITROGEN FIXING PROCESS AND APPARATUS
Filed June 13, 1921
1,466,625
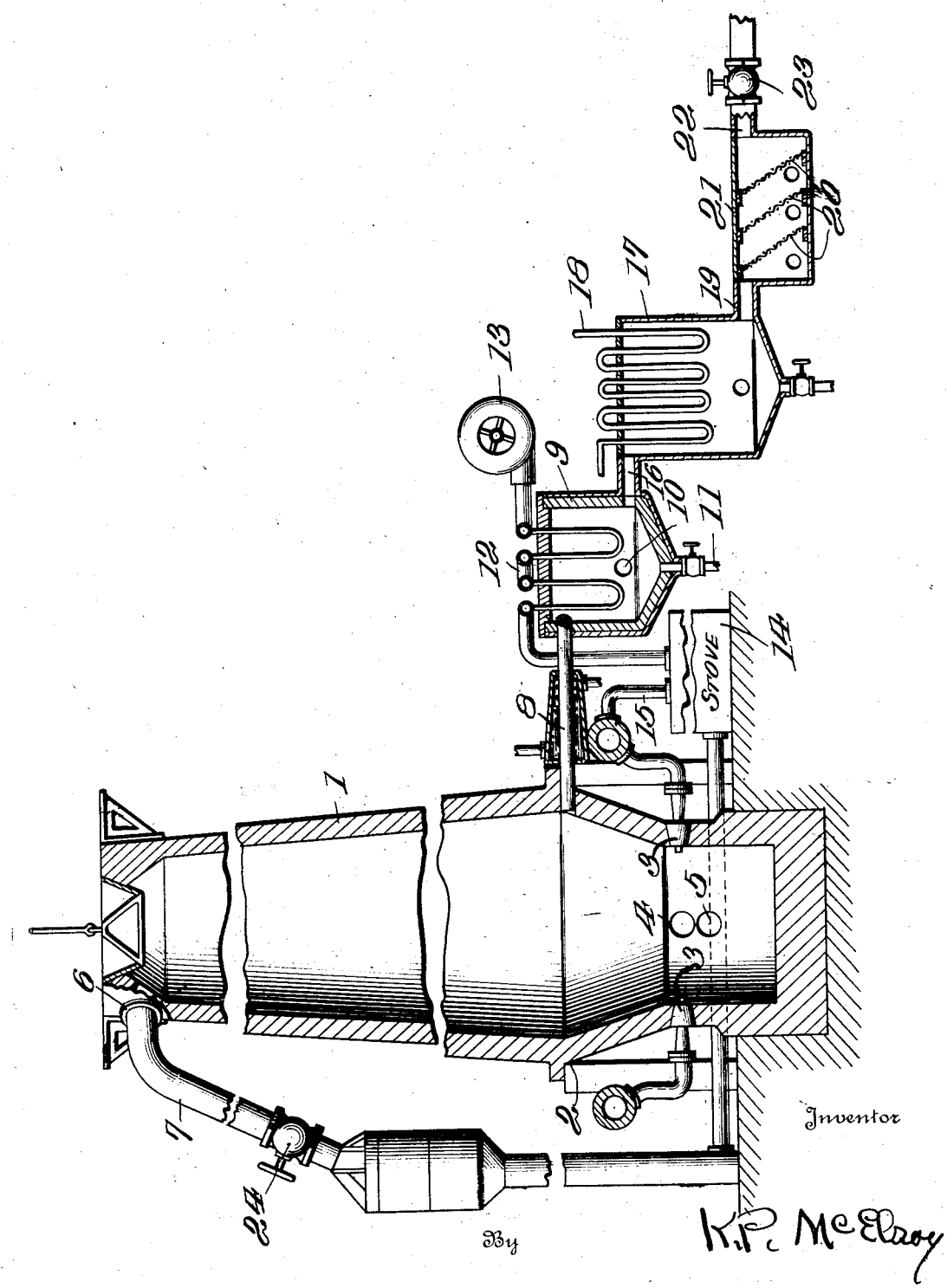

Patented Aug. 28, 1923.

1,466,625

UNITED STATES PATENT OFFICE.

KARL P. McELROY, OF WASHINGTON, DISTRICT OF COLUMBIA, ASSIGNOR TO FERRO CHEMICALS INC., OF WASHINGTON, DISTRICT OF COLUMBIA, A CORPORATION OF DELAWARE.

NITROGEN-FIXING PROCESS AND APPARATUS.

Application filed June 13, 1921. Serial No. 477,205.

*To all whom it may concern:*

Be it known that I, KARL POMERY MCEL-ROY, a citizen of the United States, residing at Washington, in the District of Columbia, have invented certain new and useful Improvements in Nitrogen-Fixing Processes and Apparatus, of which the following is a specification.

This invention relates to nitrogen fixing processes and apparatus; and it comprises a method of operating blast furnaces for the production of iron or ferro alloys and cyanid wherein a blast furnace of the usual type and producing molten metal and molten slag is supplied with alkalies in addition to the usual charge and a certain regulated portion of the hot gases is withdrawn from the furnace at or near the hottest zone carrying cyanid vapors, heat being supplied to the air blast in amount sufficient to cause a relatively high concentration of cyanid vapor in such gases; and it also comprises the combination of a shaft furnace of the general nature of a blast furnace or slagging gas producer, said furnace being provided with the usual tuyères, metal and slag outlets and charging devices and being also provided with a plurality of adjustable gas outlets at different levels, there being gas outlet located at or near the hot zone and also at a higher point, with means for recovering condensable nitrogen compounds carried by the gases passing outwards through the first-mentioned outlet, said means including cooling means to abstract heat from the gases and produce condensation of nitrogen compounds and filtering means for the gases so cooled; said cooling means advantageously being adapted to return the heat so abstracted to air supplied to the said tuyères; all as more fully hereinafter set forth and as claimed.

In the ordinary operation of an iron furnace, a column of a permeable mixture of iron ore, coke and flux slowly descends through a shaft to a hearth chamber or crucible. At the tuyères is introduced a hot blast which produces molten iron and molten slag and a gas which is really a rich producer gas. The temperature at this point is very high and the gas is of course very hot. In the usual practice there is a limit to the temperature which can be used in the blast, too much heat in the blast raising the furnace temperature to a dangerous point. As the gas ascends through the column, it gives up its heat and finally emerges in a relatively cold condition, being sometimes at a temperature of 250° C. or lower. In the vicinity of the tuyères, that is, in the hot zone, some of the carbon and some of the nitrogen unites with such potassium or other alkali metal as may be present to form cyanid, which is mainly in the form of vapor or fume in the upward going current of gases. The formation of cyanid vapors is an endothermic action and the presence of alkalies in the furnace causes the expenditure of fuel in the hearth. The cyanid vapors condense above this zone and the cyanid is broken up again. Sodium compounds behave in the same way as those of potassium. Such potassium compounds as occur in the issuing gas are present as a dust or fume of oxidized nature, being largely potassium carbonate. The gas drawn off (blast furnace gas) is of the same nature as producer gas, save that it is poorer, more or less of its CO being replaced by $CO_2$ by actions in the upper part of the shaft. If the furnace be supplied with a substantial amount of potassium compounds in the charge and if gas be drawn off from the hotter zone, commercial production of potassium cyanid, with incidental production of a very rich producer gas becomes possible. The potash may be added to or occur in the charge in the form of natural potassiferous silicates, such as feldspar, greensand, leucite, etc., as described in the Spencer and McElroy Patent No. 1,156,108, whereon the present invention, in some aspects, is an improvement. Potash may however be added in other forms. In another application, Serial No. 208,647 (Patent No. 1,390,533), filed December 24, 1917, I have described and claimed a process of producing ammonia wherein a blast furnace produces potassium cyanid in the manner just described and the cyanid produced is treated with steam, to form ammonia and potassium carbonate. This carbonate of potash, or some of it, may be returned to the charge.

The formation of cyanid in the blast furnace, with or without pig iron production, involves the expenditure of energy and this energy is supplied in the form of combustion energy of carbon reinforced by heat carried in the air blast. The hotter the air the greater is the energy applicable to the work of the furnace. Furthermore cyanid is formed only at relatively high temperatures and the higher the temperature the greater are the velocity of formation, the yield and, consequently, the absorption of heat. Therefore, from the practical standpoint, the production of cyanid depends upon an adequate supply of high temperature heat, that is, heat available for work at high temperatures. In the present invention I provide a supply of such heat by heating the air blast to a relatively high temperature: at least 500° C. and sometimes as high as 1000° C. or even higher. The temperature used is of course limited by the ability of the heating apparatus to withstand it without undue wear and tear. In producing this high blast temperature I may recuperate the sensible heat of the gases withdrawn from the hot zone of the furnace and transfer such heat to the air blast. The result of the high blast temperature is to provide a large supply of high temperature heat to be absorbed in the formation of cyanid vapor in quite large concentration in the gases of the hot zone of the furnace. This makes it possible to withdraw a relatively large amount of cyanid from the furnace in withdrawing a comparatively small volume of gas from the hot zone. A great part of the gas carrying cyanid is not withdrawn and is caused to rise through the shaft where it comes in contact with the descending charge containing alkali. I have found that the formation of cyanid from alkali, such for example as sodium or potassium carbonate and carbon when heated in the presence of producer gas is markedly accelerated by the presence of cyanid itself. This is perhaps to be expected in consideration of the high reducing activity of cyanid as compared with carbon. Carbonate and cyanid heated together to 1000° C. or over yield alkali metal. Perhaps the reactions between carbonate and cyanid may be represented by the successive equations:

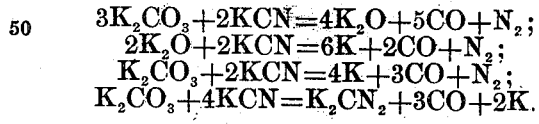

$3K_2CO_3 + 2KCN = 4K_2O + 5CO + N_2$;
$2K_2O + 2KCN = 6K + 2CO + N_2$;
$K_2CO_3 + 2KCN = 4K + 3CO + N_2$;
$K_2CO_3 + 4KCN = K_2CN_2 + 3CO + 2K$.

As alkali metal in the presence of carbon and nitrogen is readily converted to cyanid and as cyanamid heated with carbon yields cyanid, the net result is the cyanidation of the alkali, the original cyanid acting catalytically in producing more. Whatever the reaction in the furnace shaft the contact of rising cyanid vapor with descending alkali, by virtue of the latent and sensible heat of such vapor, provided the feed of alkali be properly regulated, results in the return to the hearth of alkali very largely already converted into cyanid, since cyanid is the stable form under the conditions. This liquid cyanid coming to the hearth, with or without other alkali compound, in being vaporized absorbs heat generated by the combustion of preheated carbon with preheated air and serves to moderate the temperature which might otherwise, as some times happens in present blast furnace practice, mount to a dangerous point. In order to maintain the temperature high enough for the gas to carry a relatively large concentration of cyanid vapor, but not too high, I carefully regulate the proportion of alkali charged with the material into the furnace and the volume of very hot gas withdrawn from the hot zone in correlation with the blast temperature and the rate of driving, that is, the volume of air blown per minute. I regulate the operation so that there is established in the furnace what may be termed a dominant mass or dominant pool of cyanid existing in both the liquid and the vapor phases, feeding alkali and supplying heat to such pool in quantity (both of alkali and heat) such as to maintain the dominance of cyanid in the hot zone while withdrawing cyanid vapor in quantity substantially equivalent to the alkali charged. Also by such regulation, with adequate blast temperature, I maintain in the gases of the hot zone a cyanid vapor concentration of at least five per cent volume and, with a small make of iron and a small proportion of silica and alumina in the charge, this concentration may be as high as fifteen to twenty per cent or even higher. I am thus able to operate a blast furnace so as to make pig iron or ferro-alloy and cyanid in almost any desired ratio with a by-product of high-grade producer gas. So doing I can obtain a relatively high efficiency in the use of fuel.

The fuel economy in the usual operation of pig iron blast furnaces is rather poor, this being particularly so in the case of furnaces using coke; and it is one of the objects of the present invention to utilize some of this lost energy in making cyanid. In recovering the cyanid hot gases are abstracted from the bosh zones so that, in contradistinction to the usual furnace practice, not all the gases produced in the hearth ascend through the shaft; part being diverted and removed. Considered purely from the standpoint of the iron making function itself, that is, apart from the manufacture of cyanid, this diversion of gases offers certain advantages. The theoretical heat or energy requirements in making the usual grades of pig iron and ferro alloys are from 3000 to 5000 centigrade heat units (calories) per unit of metal. The requirements vary with the quality of materials used, the composition of metal produced, and the construction and size of furnace. With full utilization of the fuel value of combustion heat, of coke containing 90 per cent of fixed carbon and developing 7290 heat units, the consumption of from 0.45 to 0.65 parts of coke should, theoretically, be sufficient for the production of 1 part of pig iron. In modern practice even the higher figure is never attained for the poorer grades of iron, and in general the consumption is from 0.80 to 1.5 parts and even higher in the case of certain ferro alloys. The reason for this is that in the furnace itself the maximum development of the fuel energy is about one-half, corresponding to a ratio of 30 parts $CO_2$ to 70 parts CO in the top gas. The other half of the fuel energy is in part utilized by burning the top gas in the stoves for heating the blast; but this partial utilization is largely offset, usually, by the sensible heat passing away with the top gas. In other words, with the amount of gas going through the shaft and emerging as top gas, in the present practice there is a considerable loss of energy. This loss of energy can be reduced by reducing the amount of gas passing through the shaft. In so doing the ratio of $CO_2$ to CO in the top gas is raised, or in other words the fuel value is better utilized, the top gas leaves colder, the sensible heat of the cyanid-carrying gas can be utilized for at least part of the air heating and the fuel value of the latter gas, which is very high, can also be utilized with better efficiency. The net result, irrespective of the cyanid formation, is a considerable improvement in the utilization of the energy of the fuel supplied to the blast furnace.

While I have so far described the operation of this apparatus as that of a blast furnace for producing iron, it is obvious that the production of iron is, or may be, merely a subordinate function in the production of potassium cyanid. But even in such a case it is always advisable to have some iron oxide present in the charge and this iron may be recovered as a valuable by-product. The iron necessary however may be furnished by returning to the top of the furnace iron tapped off from its base; or the iron may be furnished in the form of scrap iron. Instead of using potassium compounds, which I regard as the most desirable for the present purposes, sodium compounds may be used as well, the charge, for example, containing a certain amount of sodium carbonate. In a copending application, Serial No. 483,160, I have described and claimed a process wherein sodium salts are used, soda and potash being subsequently separated from each other as oxalates. I regard it however as better to work with a charge containing potash or potassium salts and to have this potash, at least in part, present in the form of natural silicates, since this enables the recovery of potash as another valuable by-product. While I have stated the product to be potassium cyanid, I do not wish to imply that all the fixed nitrogen in the product is necessarily in the form of cyanid, since, as a matter of fact, many other nitrogen compounds occur in greater or less amount. There are also dust and other solid matters which are not nitrogen compounds. It is, however, convenient for the present purposes to call the product which is so recovered, potassium cyanid.

In the present invention, I provide convenient means for the production and recovery of potassium cyanid operating upon the principles above set forth. As the reaction chamber I may use any ordinary type of blast furnace producing iron from iron ore, or, which is the same thing, of slagging producer, having shaft and hearth chambers lined with the usual materials and provided with the usual tuyères and charging devices. It may be water cooled or water jacketed in the usual way. The blast furnace or producer is however provided with one or more outlets for gases at or near the hottest zone within the furnace, this outlet for gas serving to deliver gas of the nature of producer gas carrying vapors and fumes of potassium cyanid. I also provide the shaft with a gas outlet at a higher point; a point near the charging device, and withdraw a regulated proportion of the gases produced in the operation through this secondary outlet. This secondary outlet of course corresponds to the normal gas offtake of the ordinary blast furnace; it is provided with the usual downcomer and dust chamber. The relative proportion of gas withdrawn at the two outlets depends on the amount of cyanid produced and its concentration (as vapor) in the withdrawn bottom gas. It is of course always an object to have this concentration as high as possible. To this end I may withdraw a relatively small proportion of gases at the bottom. It may however be noted in this connection that, aside from cyanid production, the loss of CO to the shaft in withdrawing bottom gases in this manner is usually beneficial since the hearth region, in developing the necessary heat there, produces much more CO than is necessary for reduction above. Withdrawal of CO at the bottom therefore means a better utilization of the residual CO in the upper shaft. Since I may run the charge with a relatively large proportion of potassium compounds, the gas withdrawn from the secondary outlet sometimes carries some oxidized potassium compounds as dust which may be worth recovering. It is of course my object to withdraw practically all of the potash of the charge as potassium cyanid from the primary or hot gas outlet, but a certain small proportion may pass through the charge and come out with colder gas as potassium carbonate, fume, etc. The provision of this secondary gas outlet is for the purpose of providing preheat, reduction, etc. to the charge materials passing downward to the hot zone.

As above noted, the regulation of the furnace operation is important. By variation of the quantity of gas withdrawn through the primary outlet, and hence of the quantity of gas from the hearth put through the shaft and out of the secondary outlet, control of the furnace operation is secured. Since the energy absorbed in cyanid formation and vaporization remains in the hearth gas as latent heat and potential energy of reversion of cyanid to oxid in the presence of CO with deposition of carbon, setting free nitrogen, and since, under the counter current conditions existing in the usual high blast-furnace shaft, it is possible to accomplish in the shaft a great part of the total work of metal smelting, leaving but little of this work to be done in the hearth, it follows that the greater part of the primary combustion heat (CO formation) of the carbon burned in the hearth, including the sensible heat acquired by the carbon in descending through the shaft and the blast heat, less the sensible heat carried up in the hearth gases and less the heat loss (in the hearth) by radiation, slag, metal, etc., is available for cyanid vapor formation in the hearth. Hence the greater part of the energy applied to the furnace, comprising the combustion energy of carbon and the heat carried in the air blast, will, in the substantial absence of gasification or "solution" of carbon in the shaft, be contained in the gas produced in the hearth in the form of latent heat of cyanid vapor, sensible heat of cyanid, CO and nitrogen, potential energy of cyanid reversion and combustion energy or reducing energy of CO. Therefore the withdrawal of gas through the primary outlet removes considerable energy from the furnace and largely determines the net input of energy to the furnace; the variation of the quantity of gas so withdrawn affords a means of regulation of the furnace operation by coordination of the energy input with the work to be done. Therefore, other conditions being fixed—volume and temperature of blast and proportion of alkali in the charge (which determines the ratio of nitrogen fixation to metal produced) I can adjust the relative proportions of gases leaving the furnace through the primary and secondary outlets so as to make the operation of the furnace smooth and regular and at the same time relatively efficient as to fuel consumption. This adjustment may be made in conformity with the top temperature, that is the temperature of the gases leaving the furnace by the top or secondary outlet. The temperature and $CO_2$ ratio in the top gas is a measure of the energy utilization in the shaft; other things being equal, the more hearth gas passing through the shaft, the less proportion of its energy will be absorbed in the shaft work and the greater proportion of such energy will remain in the top gas in the form of sensible heat and combustion energy of CO; hence the top temperature and thus the utilization of energy may be controlled by regulation of the relative proportions of primary and secondary gas. By such regulation, I am able, when producing substantial amounts of metal, to control the gasification or "solution" of carbon in the shaft. In present blast furnace practice, with all of the hearth gas rising through the shaft there is a great excess of energy over that required in the shaft work as is evidenced by high temperature and low $CO_2$ ratio, which is due to the reversible reaction $CO_2 + C \rightarrow 2CO$ going to the right under the influence of the excess of free energy as sensible heat of the gas rising from the hearth. This reaction involves 38,880 calories. This heat is absorbed when the reaction goes to the right and is set free by the reversal. The matter of gasification or solution of carbon in the shaft as a whole depends largely on the balance of this reaction which is actually or potentially proceeding in both directions in different parts of the shaft. The reaction is catalyzed by iron and other metals and by regulation of the quantity of gas going through the shaft, I am able not only to limit or prevent shaft gasification but to cause a net deposition of carbon from the gas. In so working, the gas may go out the secondary outlet at a substantially lower temperature and with a higher $CO_2$ ratio than in prior practice. To the net extent to which this breaking up in the shaft of 2CO into C and $CO_2$ takes place, the primary combustion heat of carbon is doubled at the expense of the secondary heat. The carbon deposited from the gas becomes available for cyanid formation and for combustion in the hearth. Thus not only is it unnecessary to provide carbon in the charge to be gasified in the shaft by $CO_2$ in order to cool the top, but, carbon can be left out of the charge which otherwise would have to be provided to give hearth heat and to form cyanid. The top gas is of course proportionately poorer in combustible value.

If, in regulating the concentration of cyanid in the hearth, liquid cyanid descends to the tuyères level it is there burned to carbonate or oxid vapor. This then comes in contact with carbon, an excess of nitrogen being always present, and is converted to cyanid, since cyanid is the stable form under the conditions. The gases coming from the primary outlet are, as stated, very hot, their temperature being usually from 1000° to 1400° C. and they carry a substantial concentration of cyanid in the form of vapor and fume. They may be at or near the saturation point for cyanid vapor at the temperature of withdrawal. It is necessary to cool down these gases to recover the cyanid and in so cooling down it is advantageous to abstract the heat by recuperator or regenerator means of some type and transfer it to the air used in the tuyères of the furnace, thereby giving more heat available for making cyanid. The gases leaving the furnace or reaction chamber may be first led through a comparatively large quieting chamber where they are somewhat cooled and their velocity reduced, with the result of depositing much of the cyanid as dust or molten liquid, as the case may be. Whether one or more of these cooling chambers are necessary, of course, depends upon the amount of gas, the size of the chamber or chambers, etc. For reasons of economy of heat and size, I regard it as better to provide the first or quieting chamber with positive cooling means and to use as such cooling means a current of air, this air being afterwards sent to the tuyères, thus utilizing the heat removed in cooling. Advantageously, the cooling means takes the form of a system of depending steel or iron pipes in a suitable chamber. With depending pipes, it is easier to detach adhering condensed and solidified matter. From the cooling chamber or chambers, the gas may be led through baffled chambers, centrifugal fume separators, filters, electrical precipitators, or any other suitable device for collecting residual fume. Electrical precipitators, such as those formerly used for collecting sublimed white lead, work well. However, with efficient cooling of the gases, the fume or dust of cyanid produced is ordinarily coarse enough to render possible the use of filters and render unnecessary electrical precipitation. Where the material collected by the filters is of corrosive nature, ordinary textile fabrics are undesirable and various types of mineral filtering materials may be employed. However, where the gases are well cooled and dry, textile fabrics may frequently be used. In such a case, the filter may take the form of a bag or septum of textile fabric. As described and claimed in a copending application Serial No. 387,817 the abstracted gases may be passed through a carbon filter which may contain alkali and the gases may thus be partially cooled before passing through the recuperator.

In the accompanying illustration is shown, more or less diagrammatically, an apparatus under the present invention. In this showing, which is a vertical section, element 1 is a shaft furnace having the usual bosh 2, tuyères 3, slag notch 4 and metal notch 5. Above the bosh the shaft extends upwardly some distance and is closed with the usual bell-and-cone device for feeding in the charge. Below this feed device is a gas outlet 6 and a downcomer 7 of the type usual in blast furnaces. At a point of high temperature in the furnace a gas outlet of substantial capacity is provided and leading from such outlet, as shown, is a water cooled conduit 8. This gas outlet is intended to carry off vapors and fumes of potassium cyanid. There may be a plurality of outlets arranged around the circumference of the furnace. I usually provide sufficient outlet for hot gas to enable me to lead off as much or more gas from the smelting zone than through the top or secondary outlet 6, these relative quantities of gas being adjusted, in operation, by means herein after shown. The furnace may be of any usual and ordinary construction or material. It may be water jacketed, provided with cooling plates in the wall or lined with ordinary refractory materials.

As shown, the gas and cyanid conduit 8 is water jacketed and leads to a cooling and quieting chamber 9 which it enters tangentially to produce a good circulation therein. While this chamber may be water jacketed or otherwise cooled, I consider it better to produce a positive cooling by including air pipes. As shown, depending within this chamber 9, which is provided with a manhole 10 and a gated outlet 11 for removing cyanid, are pipes 12 serving to cool the gases and heat air. Cyanid depositing on these pipes can be readily detached and falls to the bottom of the chamber. Air under pressure is supplied to these cooling pipes from a blower device, shown diagrammatically at 13. After passing through the cooling pipes the air, which is now heated to a high temperature, may, if desirable, be sent through the usual stoves 14 for further heating and thence through line 15 to the tuyères supplying the shaft. Gas coming from the upper or cool gas outlet (6) may be used to supply these stoves. In this cooling or quieting chamber all of the cooling necessary may take place, this being a matter of design. In many cases however, I find it advantageous to use in addition another cooling device with positive cooling means. As shown, the gases coming from the first cooler pass through conduit 16 to another cooling chamber 17 where their temperature may be still further reduced by water circulating in depending pipes 18. There is usually a further deposition of cyanid in this chamber. As shown, the gases leave this chamber through conduit 19 and pass through filters 20 in chamber 21. As shown, these filters are simple septa of suitable filtering material set at an angle. The filtered and cooled gas is drawn off by conduit 22 and may be used for any purpose to which producer gas is applicable. Control of the relative proportions of gas drawn from the furnace through the primary or hot gas outlet and the secondary outlet near the top of the furnace, respectively, while maintaining a positive pressure, is secured by means of the valves 23 and 24.

In the operation of the device, all the potassium may be furnished in the form of suitable natural potassiferous silicates or a part of it may be furnished in the form of returned potash. The natural silicates, feldspar, leucite, mica schist, etc., may be employed. Frequently, iron ores may be found carrying feldspar or other potash-rich silicates as a gangue, and in this event the charge may comprise such an ore with such a proportion of the gangue as may be deemed desirable to furnish the desired amount of cyanid. The charge should also include enough lime to slag the silica and alumina present. The amount of lime may be such as to form the ordinary types of the low-iron slag of the ordinary blast furnaces; and in this event the furnace may be lined with the ordinary materials. If more lime be used, it is advantageous to line the furnace with more basic materials or with carbon, or to water jacket. The amount of iron or iron ore in the charge (either may be used) should be enough to furnish a substantial proportion of molten metal at the base of the shaft. Certain potassiferous iron silicates are known, such as glauconite, and these may be used as components of the charge. In the case of glauconite, since it is ordinarily rather fine, it is best to briquet it with coke and limestone in order to obtain a pervious charge. Glauconite may be obtained with 5 to 10 per cent potash ($K_2O$) and 20 per cent iron.

The fume and dust collected in the cooling and filtering chambers may be directly marketed for cyanid purposes, being useful, for example, in cyaniding gold ores; or it may be used as a material for making ferro cyanids. Ordinarily, however, I regard it as best to steam this collected material to produce ammonia and leave a residue of oxidized potassium salts. The ammonia so produced may be collected in any of the usual ways. The residual potash may be returned to the reaction chamber to produce more cyanid or may be sold for fertilizer purposes. Ordinarily, I return a part of it. The residual potash compounds may be leached to obtain a solution and this solution used to impregnate the coke or other components of the charge.

While I have more particularly described the use of a blast furnace of the usual type, or of a slagging gas producer, it is of course to be understood that any shaft furnace having tuyères near the base and gas outlets at two levels, one near the tuyères and one near the top of the shaft, the former being connected with a cooling and quieting chamber and with a filtering device for removing and collecting fume or dust condensed in the cooling, may be used for my purposes. The gas from which the fume and dust have been removed is a good grade of producer gas, being richer in combustible components than the usual blast furnace gas; there may, if desired, be quite a large volume of this gas and it may be used for ordinary producer gas purposes, thereby meeting part of the cost of the process. Sometimes it is profitable to so operate that less gas comes off through the secondary outlet 6 than through the primary or bottom outlet and the top gas may in some cases have little or no combustion value. The potash not returned to the system is also a valuable by-product.

In making cyanid the charge may run to make the usual slag of American blast furnaces. A slag carrying bases equivalent to about 45 per cent CaO, 40 per cent silica and 15 per cent alumina is satisfactory and not much of the potash used will go into the slag. If a more basic slag is desired, the proportion of lime may be somewhat increased with less potash going into the slag, but in this event, it is ordinarily better to have a basic lining. With the slag stated, the lining may be that usual in blast furnaces.

In using the apparatus of the present invention it is desirable, as noted, to run at very high temperatures in the crucible of the furnace, so as to give efficient slagging and conversion of any potassiferous silicates that may be present and rapid and extensive production of cyanid with formation of gas at a sufficient temperature to cause a relatively large concentration of cyanid vapor, and to this end the blast should be as hot as practicable. As stated, the formation of cyanid vapors is endothermic, absorbing heat and rendering it latent; and the more heat can be added in the blast, the greater is the possible production of cyanid, or, conversely, the less is the consumption of fuel for a given production. Because of the presence of the alkali and because of this endothermic action, this extra heating of the blast is practicable without causing unduly high temperatures in the furnace. Under these conditions but little alkali will be lost in the slag and little iron will go into the slag, the slag produced being light colored or gray, lime being mainly relied upon to aid in the volatilization of alkali and for fluxing purposes. Where they can be obtained, silicates carrying much iron, either chemically distributed therein, as in greensand or glauconite, or mechanically admixed, as in certain feldspathic ore gangues are better than mechanical admixtures of coarse ore and fragments of feldspar, etc., since the catalytic action of the iron is then better attained. In using greensand as a source of potash and iron, the iron delivered is usually rich in phosphorus.

While the gases withdrawn from the hot zone should be at as high a temperature as practicable at the point of withdrawal in order to insure efficient carrying forward of the cyanid vapors and fumes it is desirable to cool them as rapidly as possible beyond that point to prevent undesired reactions taking place at the expense of such cyanid. The first cooler should therefore be as efficient and positive in its action as possible; and as the principal item of expense is fuel, it is best to do the cooling as far as possible by the air used for the blast, employing water cooling only for a secondary cooling. Water cooling may however be employed for the primary cooling as well. The colder the gas at the point of delivery to the gas filters, and particularly when these are of textile material, the better.

When working on a relatively small scale it is sometimes desirable to reinforce the combustion heat with heat electrically developed by means of arcs as in the electric smelting of iron, by using the slag bath as resistance, or by currents induced in known ways in carbon linings provided in the hot zone. The blast may be enriched by the addition of oxygen and this increases the proportion of heat available at high temperatures.

In a modification of the invention a mass of ignited carbon is blown to a high temperature with an excess of air, alkali is then added and a relatively slow current of very hot air is passed through the mass, cyanid being recovered from the resulting gases. Such a procedure may conveniently be carried out in apparatus similar to the usual "blow and run" water gas producer.

This application is in part a continuation of application Serial No. 258,199 filed October 15, 1918, renewed June 10, 1921, Serial No. 476,609.

What I claim is:—

1. In cyanid making apparatus a furnace of the general type of a blast furnace or slagging gas producer provided with the usual tuyères, slag outlet, metal outlet and charging devices and with the usual gas outlet near the charging devices and also provided with another gas outlet located at or near the hottest zone in the furnace, a heat interchanger connected to said other outlet and means for passing air through the heat-interchanger to the tuyères.

2. In cyanid making apparatus, a furnace of the usual type of a blast furnace provided with the usual tuyères adapted for delivering hot blast thereinto and with gas outlet from the hot zone of said furnace, in combination with means for transferring heat from the gases delivered through said outlet to air and for delivering the air so heated to said tuyères.

3. In a furnace adapted for making cyanid as a by-product, a blast furnace of the usual type of those making pig iron provided with the usual tuyères and charging devices and also provided with a plurality of gas outlets, one of said outlets being the usual outlet located near the charging devices at the top of the furnace and others being located in the hot zone of the furnace, dust-removing and collecting means connected to said hot gas outlet, said means including a quieting chamber of substantial size adapted to slow down the velocity of passing gases and a filtering chamber connected to the quieting chamber.

4. In cyanid making apparatus, a furnace of the usual type of a blast furnace provided with the usual tuyères and charging devices and also provided with two gas outlets, one of said gas outlets being located near the tuyères and another being the usual outlet near the charging devices, a conduit leading from the first-named outlet, a cooling and quieting chamber connected to said conduit, hot blast means for supplying said tuyères including a source of air and including depending air pipes within said cooling and quieting chamber, and a filtering chamber connected to the cooling and quieting chamber.

5. In apparatus for fixing nitrogen, the combination of a furnace of the usual type of blast furnace or slagging gas producer provided with the usual gas outlet, charging devices, tuyères, metal and slag outlets, etc., with cyanid recovery apparatus comprising a conduit connected with said furnace at the hot zone and adapted to withdraw gases and vapors at a point of high temperature, positive cooling means in heat abstracting relationship to said conduit, and filtering means beyond the cooling means connected to said conduit and adapted to separate condensed solid matters.

6. In apparatus for smelting iron or ferro-alloys, a furnace of the usual type of blast furnace, blown with hot air, provided with gas outlet near the top and with gas outlet in the hot zone, such hot gas outlet being of substantially equal capacity relative to that of the top outlet, in combination with means for maintaining a positive pressure in the furnace and for adjusting the relative proportions of gas withdrawn from the furnace through the hot gas outlet and the top outlet, respectively.

7. In apparatus for smelting iron or ferro-alloy and recovering nitrogen compounds, a furnace of the usual type of blast furnace, blown with hot air, provided with gas outlet near the top and also provided with gas outlet from the hot zone of sufficient capacity to allow the withdrawal therethrough of gas substantially equal in amount to the gas withdrawn through the top outlet, said gas outlets being adapted to adjust the amount of gas from the hot zone which is caused to rise through the furnace shaft and being also adapted to maintain a positive pressure in the furnace.

8. In apparatus for fixing nitrogen, the combination of a furnace of the usual type of blast furnace or slagging gas producer with apparatus for recovering condensable nitrogen compounds connected with said furnace near the smelting zone and adapted to withdraw gases therefrom relatively as great in amount as the gases passing out of the usual top outlet, said apparatus comprising positive cooling means and filtering means, and with means for adjusting the quantity of gas so withdrawn in relation to the quantity of gas passing up through the furnace shaft.

9. The process of producing cyanids in a blast furnace making iron or ferro alloy with the aid of hot blast which comprises supplying such a furnace with the usual charge and with alkali, withdrawing a portion of the hot gases carrying cyanid vapors from the zone of high temperature and compensating for the heat abstracted by such gases and vapors as sensible and as latent heat by additional heat supplied to the blast.

10. The process of producing potassium cyanid in the blast furnace making iron or ferro alloy with the aid of hot blast which comprises supplying such furnace with the usual charge and with potassium compounds, withdrawing a portion of the hot gases carrying potassium cyanid vapor from the zone of high temperature and compensating for the heat abstracted by such gases and vapor as sensible and as latent heat by additional heat supplied to the blast.

11. In the manufacture of cyanid as a by-product of blast furnaces producing molten iron or ferro alloy and molten slag from an alkaliferous charge of fuel, flux and iron ore descending through a shaft to a zone of intense temperature produced by a blast of injected hot air, the process which comprises withdrawing a regulated proportion of the hot gases carrying cyanid from said zone of intense temperature, abstracting heat from the hot gases and transferring heat so abstracted to the air of such blast.

12. In iron-smelting apparatus the combination of a blast furnace or the like, an outlet for gas at or near the smelting zone, means for transferring heat from the gases delivered through said outlet to air blown into the furnace and means for adjusting the quantity of gas so delivered, relative to the quantity of gas caused to rise through the furnace shaft.

13. In the manufacture of cyanid as a by-product of blast furnaces producing molten iron or ferro alloy and molten slag from an alkaliferous charge of fuel, flux and iron ore descending through a shaft to a zone of intense temperature produced by a blast of injected hot air, the process which comprises withdrawing a regulated proportion of the hot gases carrying cyanid from said zone of intense temperature, while heating said air blast to a temperature above 500° C.

14. In nitrogen fixation the process which comprises blowing air under gas producing conditions into contact with a mixture comprising solid carbonaceous fuel, flux and alkali at a slagging temperature, and removing gases containing cyanid vapor while supplying a sufficient quantity of heat to the air blast to balance the heat absorbed in cyanid formation and vaporization.

15. In the manufacture of cyanids, the process which comprises supplying under gas producing conditions a preheated mass comprising carbon and alkali with a blast of air heated to such a temperature that the heat of combustion is great enough to cause a relatively high concentration of cyanid vapor in the gases produced.

16. In the manufacture of cyanids, the process which comprises supplying under gas producing conditions a preheated mass comprising carbon and alkali with a blast of air heated to such a temperature that the heat of combustion is great enough to cause a relatively high concentration of cyanid vapor in the gases produced and recovering cyanid from said gases.

17. In the manufacture of cyanids, the process which comprises supplying under gas producing conditions a preheated mass comprising carbon and alkali with a blast of air heated to such a temperature that the heat of combustion is great enough to cause a relatively high concentration of cyanid vapor in the gases produced and recovering cyanid from a regulated proportion of said gases while preheating said mass of carbon and alkali by another portion of said gases.

18. In the manufacture of potassium cyanid, the process which comprises supplying under gas producing conditions a preheated mass comprising carbon and potash with a blast of air heated to such a temperature that the heat of combustion is great enough to cause a relatively high concentration of cyanid vapor in the gases produced and recovering potassium cyanid from a regulated proportion of said gases while preheating said mass of carbon and potash by another portion of said gases.

19. In the manufacture of cyanids the process which comprises establishing in a suitable reaction chamber a substantial mass of liquid and gaseous cyanid to serve as a dominant pool, maintaining the dominance of cyanid in such chamber by aid of the combustion therein under gas producing conditions of preheated carbon with preheated air while feeding a regulated quantity of alkali to said pool and withdrawing therefrom cyanid vapor in quantity substantially equivalent to the feed of alkali.

20. In the manufacture of cyanids the process which comprises establishing and maintaining a dominant pool of liquid and gaseous cyanid by aid of the combustion in such pool of preheated carbon under gas producing conditions with air preheated to a temperature above 500° C., feeding a regulated proportion of alkali to the pool and withdrawing therefrom cyanid vapor in a concentration of at least five per cent by volume of the mixed gases.

21. In the manufacture of cyanids the process which comprises establishing in a suitable reaction chamber heated to a cyanid forming temperature a mass of liquid and gaseous cyanid to serve as a dominant pool, continuously feeding cyanid forming materials into said reaction chamber to react with said cyanid, and removing cyanid therefrom, while maintaining the predominance of cyanid in said pool by proportioning the rate of feed of alkali and removal of cyanid with the rate of supply of heat available for work at cyanid forming temperatures.

22. In the operation of blast furnaces producing iron or ferro alloys with cyanid as a by-product recovered from gases withdrawn from the hot zone, the method of controlling the fuel economy which includes withdrawing the gases carrying cyanid vapor from the hot zone of the furnace in quantity so regulated that the temperature of the gases leaving the top of the furnace is not higher than 250° C. and transferring sensible heat from the hot withdrawn gases to the air blast.

23. A process of fixing nitrogen as cyanid which comprises heating to a cyanid-vapor forming temperature, alkali, carbon and nitrogen together in admixture with a mass of initially present or preformed cyanid.

24. A process of fixing nitrogen which comprises contacting at a cyanid forming temperature preheated carbon and cyanid with preheated nitrogen-carrying, alkali-vapor-laden gases.

25. In nitrogen fixation a process which comprises contacting carbon, alkali, and cyanid preheated to a temperature above 1000° C. with air preheated to a temperature above 500° C.

26. In nitrogen fixation the process which comprises contacting carbon and alkali preheated to a temperature substantially higher than 1000° C. with air under gas producing conditions said air being preheated to a temperature substantially higher than 500° C. while maintaining a concentration of cyanid vapor in the gases produced substantially greater than five per cent by volume.

27. A process of fixing nitrogen as cyanid which comprises heating to a temperature above 1000° C., alkali, carbon and nitrogen together in admixture with a mass of initially present or preformed cyanid.

28. In the operation of a blast furnace producing iron or ferro-alloy with the recovery of cyanid as a by-product from hot gases withdrawn from the hot zone, the method of controlling the application of energy to work in the furnace which comprises regulating the quantity of hot gas withdrawn in conformity with the temperature and $CO_2$ ratio of the top exit gases, increasing the quantity of hot gas withdrawn with rise of said top temperature and lowering of said $CO_2$ ratio and vice versa.

29. In nitrogen-fixing apparatus, the combination of a blast furnace of the usual type, means for heating the air blast to temperatures above 500° C., means for withdrawing gases from the hot zone under positive pressure and means for adjusting the quantity of gases so withdrawn in relation to the quantity of hot gas put through the shaft.

30. In the operation of a blast furnace for the fixation of nitrogen and smelting of iron or ferro-alloy the process which comprises charging alkali compounds with ore, flux and carbonaceous fuel into the furnace, maintaining by the aid of a high blast heat a temperature in the hearth sufficient to form freely running molten metal and molten slag and a substantial concentration of cyanid vapor in the gases produced in the hearth, removing a regulated proportion of such gases from the furnace through gas outlet provided in the hot zone, cooling the removed gases to cause condensation of cyanid and collecting the condensed cyanid.

31. In the manufacture of cyanid as a by-product of blast furnaces producing molten iron and molten slag from a charge of fuel, flux and ore descending through the shaft to a zone of intense temperature produced by a blast of injected hot air, the process which comprises withdrawing hot gases carrying cyanid from the hot zone of the furnace, abstracting sensible heat from such gases, transferring heat so abstracted to the air of said blast and burning said gases for further heating of said blast.

In testimony whereof, I have hereunto affixed my signature.

K. P. McELROY.